(12) United States Patent
Snodgrass

(10) Patent No.: US 7,260,363 B1
(45) Date of Patent: Aug. 21, 2007

(54) UNIVERSAL POWER AMPLIFIER

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 552 days.

(21) Appl. No.: 10/465,771

(22) Filed: Jun. 19, 2003

(51) Int. Cl.
*H04B 1/44* (2006.01)
*H04B 1/40* (2006.01)
*H01P 1/10* (2006.01)
*H01P 5/12* (2006.01)

(52) U.S. Cl. ............................ 455/83; 455/84; 455/78; 333/101

(58) Field of Classification Search ................... 455/84, 455/78, 83; 333/101
See application file for complete search history.

(56) References Cited

U.S. PATENT DOCUMENTS

| | | | |
|---|---|---|---|
| 4,097,805 A * | 6/1978 | Fujii et al. ..................... | 455/76 |
| 5,444,863 A * | 8/1995 | Torii ............................ | 455/83 |
| 5,729,829 A * | 3/1998 | Talwar et al. .............. | 455/63.1 |
| 5,809,405 A * | 9/1998 | Yamaura .................... | 455/101 |
| 5,913,153 A * | 6/1999 | Nakamoto et al. ............ | 455/78 |
| 6,922,554 B2 * | 7/2005 | Takalo et al. ................ | 455/307 |
| 2002/0151281 A1 * | 10/2002 | Izadpanah et al. ............ | 455/83 |

OTHER PUBLICATIONS

Co-filed Patent Application entitled "Virtual Channel Communications System", having a U.S. Appl. No. 10/465,715, filed Jun. 19, 2003, T. Snodgrass.

* cited by examiner

*Primary Examiner*—Matthew Anderson
*Assistant Examiner*—Wen Huang
(74) *Attorney, Agent, or Firm*—Nathan O. Jensen; Kyle Eppele

(57) ABSTRACT

A universal power amplifier for amplifying and filtering transmit and receive signals has an input switch for switching transmit and receive signals. Transmit paths in the universal power amplifier are connected to the input switch. The transmit paths comprise filters for filtering the transmit signals and amplifiers for amplifying the transmit signals. Receive paths are connected to the input switch. The receive paths filter and amplify the receive signals. A first receive path shares one of the filters a first transmit path to filter a receive signal. A power output stage is connected to the transmit paths for amplifying the transmit signals into high-power transmit signals. A transmit/receive switch is connected to the power output stage and the receive paths for switching the high-power transmit signals and receive signals to an antenna.

5 Claims, 3 Drawing Sheets

UNIVERSAL POWER AMPLIFIER

CROSS REFERENCE

Related co-filed application "Virtual Channel Communications System" by Timothy E. Snodgrass, Ser. No. 10/465,715, is hereby incorporated by reference.

BACKGROUND OF THE INVENTION

This invention relates to communications systems, transmission and amplification of signals, and specifically to a universal power amplifier.

Communications systems frequently require operation over several bands using several different waveforms. These communications systems require varying levels of connectivity and frequently operate simultaneously in receive and transmit modes on several bands. In the past a dedicated channel for each band was implemented. On a typical airborne platform seven or more channels would be implemented with associated transceivers, power amplifiers, and antennas. These multiple channels add to the amount of equipment required with increased weigh and cost with reduced reliability.

What is needed is a system that provides the needed connectivity while reducing equipment quantity and weight. Furthermore such a system requires equipment with new capabilities such as a power amplifier that is able to support the varying system channel requirements while offering reduced weight and cost.

SUMMARY OF THE INVENTION

A universal power amplifier for amplifying and filtering transmit and receive signals is disclosed. The universal power amplifier comprises an input switch for switching the transmit and receive signals. A first transmit path, connected to the input switch, filters and amplifies a first transmit signal. The first transmit path comprises a first agile filter for filtering the first transmit signal. A first receive path, connected to the input switch, filters and amplifies a first receive signal. The first receive path comprises the first agile filter for filtering the first receive signal. A power output stage is connected to the first transmit path to amplify the first transmit signal into a high-power first transmit signal. A transmit/receive matrix switch is connected to the power output stage and the first receive path to switch transmit and receive signals to an antenna.

The first transmit path further comprises a first transmit/receive switch for switching the first agile filter between the first transmit signal and the first receive signal. A low-noise amplifier is connected to the first agile filter to amplify the first transmit signal. A second agile filter is connected to the low-noise amplifier to filter the first transmit signal. A second transmit/receive switch is connected to the second agile filter to switch the first transmit signal to the power output stage.

The first receive path further comprises a first receive switch for switching the first receive signal to the first transmit/receive switch, the first transmit/receive switch for switching the first receive signal to the first agile filter, the low-noise amplifier connected to the first agile filter to amplify the first receive signal, the second agile filter connected to the low-noise amplifier to filter the first receive signal, the second transmit/receive switch connected to the second agile filter to switch the first receive signal, and a first receive amplifier connected to the second transmit/receive switch to amplify the first receive signal and further connected to the input switch that provides the first receive signal at an output.

The first transmit path further comprises a first amplifier connected to the input switch to amplify the first transmit signal, a first ALC attenuator connected to the first amplifier and the first transmit/receive switch to vary the first transmit signal level, a second ALC attenuator connected to the low-noise amplifier and the second agile filter to vary the first transmit signal level, and a first transmit switch that is connected to the second transmit/receive switch and that switches the first transmit signal to the power output stage.

The universal power amplifier further comprises a second transmit path connected to the input switch to filter and amplify a second transmit signal. The second transmit path comprises a second transmit switch and a third amplifier connected to the second transmit switch. The third amplifier amplifies the second transmit signal. The universal power amplifier further comprises a third transmit path that amplifies a third transmit signal. The third transmit path further comprises the second transmit switch for switching the third amplifier between the second transmit signal and the third transmit signal. The third amplifier amplifies the third transmit signal.

The second transmit path further comprises a third agile filter connected to the input switch and the second transmit switch to filter the second transmit signal, a third ALC attenuator connected to the third amplifier to vary a signal level of the second transmit signal, a fourth amplifier connected to the third ALC attenuator to amplify the second transmit signal, and the first transmit switch connected to the fourth amplifier to switch the second transmit signal to the power output stage for amplification.

The third transmit path further comprises the third ALC attenuator connected to the third amplifier to vary a signal level of the third transmit signal, the fourth amplifier connected to the third ALC attenuator to amplify the third transmit signal, and the first transmit switch connected to the fourth amplifier to switch the third transmit signal to the power output stage for amplification.

The universal power amplifier further comprises a second receive path. The second receive path comprises the first receive switch connected to the input switch and the first transmit/receive switch. The first receive switch switches a second receive signal and the first receive signal.

The universal power amplifier further comprises a switched harmonic filter bank connected to the power output stage and the transmit/receive matrix switch to filter the first transmit signal.

It is an object of the present invention to provide a universal power amplifier that is able to support varying system channel requirements while offering reduced weight and cost.

It is an object of the present invention to reduce weight and cost by sharing amplifier and filter functions within the universal power amplifier.

It is an advantage of the present invention to provide a high-power output for several types of transmit signals.

It is an advantage of the present invention to provide filtering to maintain excellent signal-to-nose ratio of a transmit signal and rejection of spurious and off-channel signals in receive.

It is a feature of the present invention to provide enhanced versatility by internal switching to support virtual communications channels.

It is a feature of the present invention to enable reuse of transmit path filtering in a receive path and reuse of transmit path amplification for two transmit functions by using internal switching.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
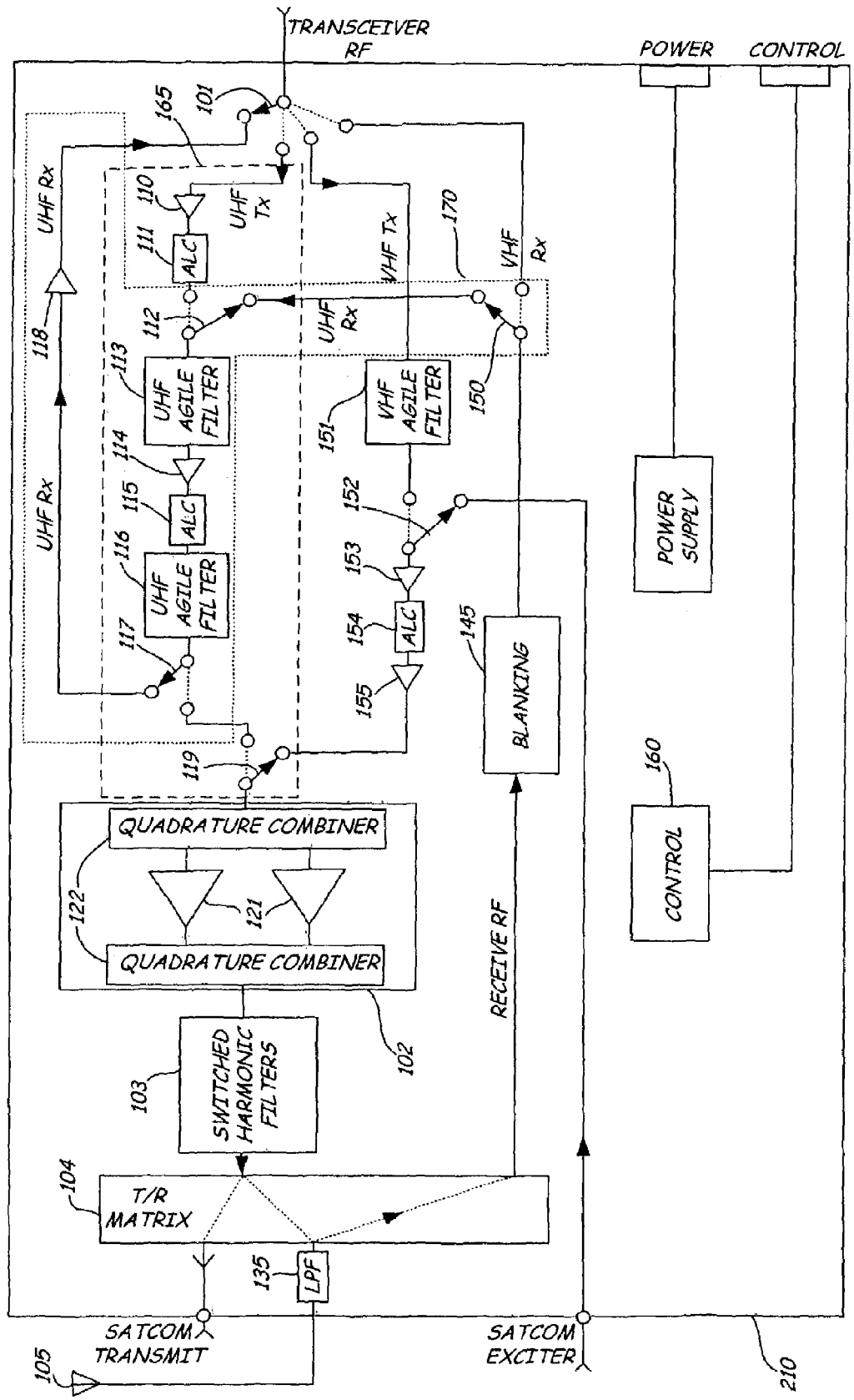
FIG. 1 is a block diagram of a universal power amplifier of the present invention showing a UHF transmit path and a UHF receive path.

The present invention is for a universal power amplifier (UPA) 210, shown in FIG. 1, that provides high-power RF capabilities over a typical 30-MHz to 400-MHz frequency range. The universal power amplifier 210 contains a quadrature coupled RF power output stage 102 to provide a 100-W output, as well as filtering for off-channel noise and spurious signals. The versatility of the universal power amplifier 210 is enhanced by internal switching described in the following paragraphs to support virtual communications channels as described in the co-filed application. The internal switching enables reuse of transmit path filtering in a receive path and reuse of transmit path amplification for transmit functions.

Figure 2:
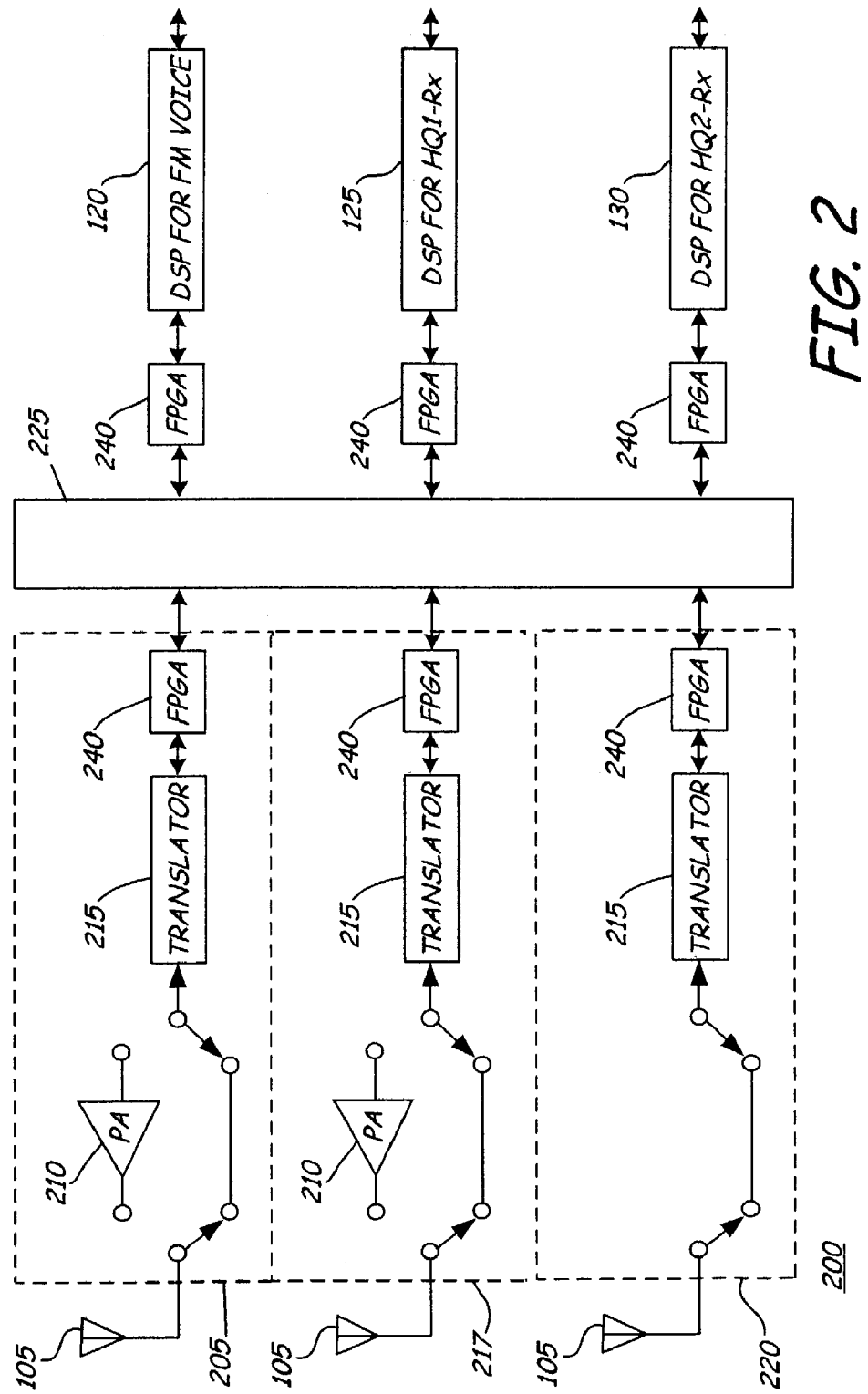
FIG. 2 is block diagram of a virtual channel communications system employing the universal power amplifier of the present invention.

FIG. 2 is a block diagram of a virtual communications system 200 presented in the co-filed application with the universal power amplifier 210 used in PA-translators 205 and 217. The universal power amplifier 210 may also be used in applications other than the virtual communications system 200.

The universal power amplifier 210 provides power amplification for VHF, UHF, and SATCOM transmit and provides VHF and UHF receive paths. The power output, frequency coverage, and other parameters of the present invention are typical and used for discussion purpose only. Other parameters may be utilized and still be within the scope of the present invention. The UHF, VHF, and SATCOM bands are used for purposes of discussion in the following paragraphs.

Figure 3:
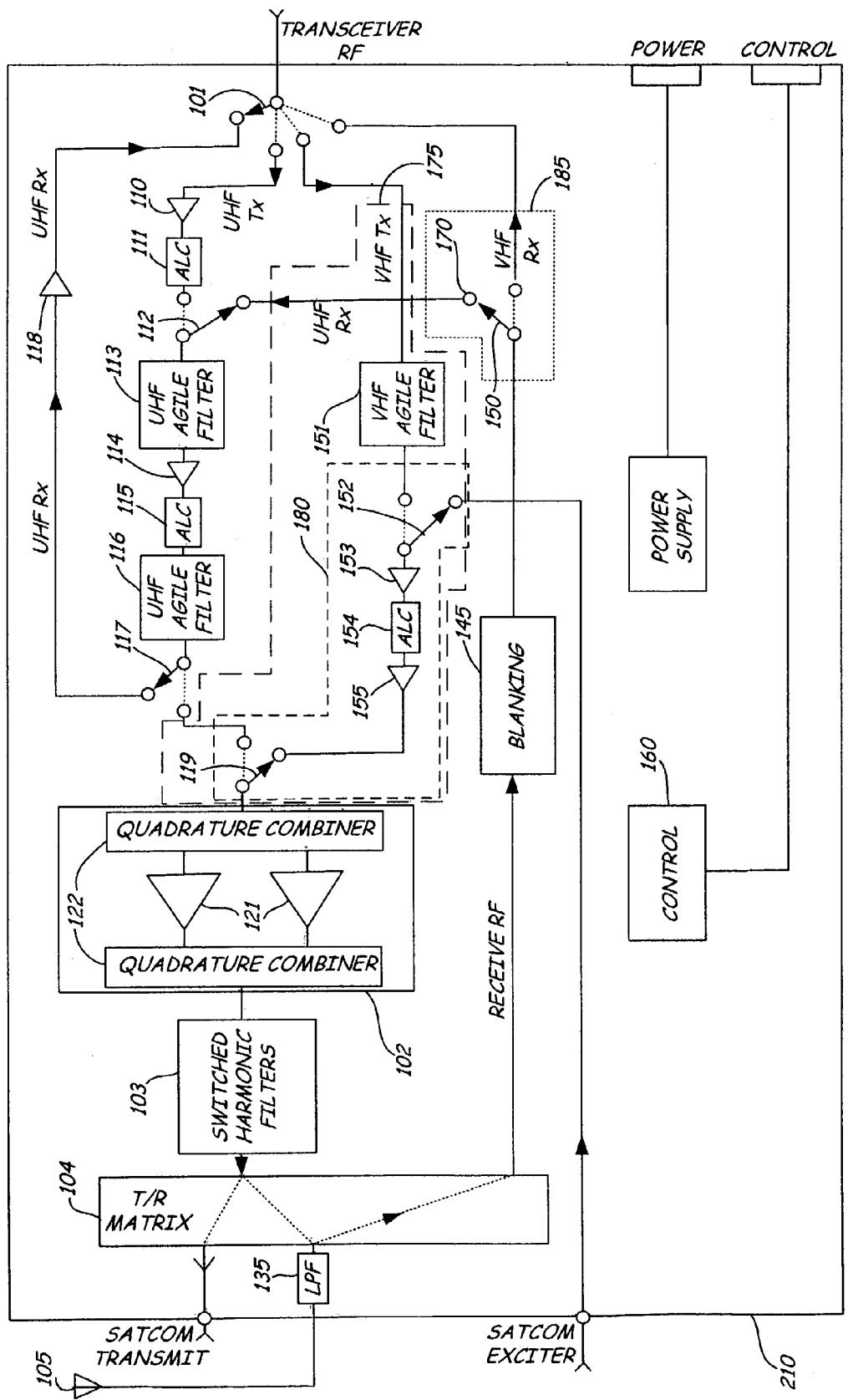
FIG. 3 is a block diagram of the universal power amplifier shown of FIG. 1 showing a VHF transmit path, a VHF receive path, and a SATCOM transmit path.

FIG. 1 shows a first transmit path 165 that may be a UHF transmit path 165 and a first receive path 170 that may be a UHF receive path 170. FIG. 3 is similar to FIG. 1 and shows a second transmit path 175 that may be a VHF transmit path 175, a second receive path 185 that may be a VHF receive path 185, and a third transmit path 180 that may be a SATCOM transmit path 180. An input switch 101 is used in combination with other switches discussed in the following paragraphs for switching between the various paths.

In the first transmit path 165, a first (UHF) transmit signal from a translator 215 in FIG. 2, exciter (not shown) or other signal source at approximately +20 dBm is switched with the input switch 101. The UHF transmit signal from the input switch 101 is applied to a first amplifier 110 where the UHF transmit signal is amplified to maintain a high signal-to-noise ratio. The UHF transmit path 165 further comprises a first automatic level control (ALC) attenuator 111 for power level control and universal power amplifier 210 protection. This is done by using a high-power fixed stage for the first amplifier 110 and with the first ALC attenuator 111 operating at lower power. The high-power first amplifier 110 absorbs variations of gain in a manner to maximize the signal level at the first ALC attenuator 111 to maintain the high signal-to-noise ratio.

In the first (UHF) transmit path 165 in FIG. 1 the UHF transmit signal output of the first ALC attenuator 111 is connected to a first (UHF) transmit/receive (Tx/Rx) switch 112 that switches the input to a first (UHF) agile filter 113 between UHF transmit and UHF receive. The output of the first agile filter 113 is amplified in a low-noise amplifier 114 and then passed to a second ALC attenuator 115 for additional power level control. A second (UHF) agile filter 116 connected to the second ALC attenuator 115 provides additional filtering of the low-noise amplifier 114 output. The output of the second agile filter 116 is connected to a second (UHF) transmit/receive (Tx/Rx) switch 117 for switching between UHF transmit and UHF receive.

In the UHF transmit path 165 in FIG. 1, the second Tx/Rx switch 117 connects the UHF transmit signal to a first (UHF/VHF) transmit (Tx) switch 119. The UHF/VHF Tx switch 119 is used to switch between UHF transmit and VHF transmit. In the UHF transmit path 165 the UHF transmit signal output is connected to the power output stage 102 for amplification to a high-power first transmit signal. The power output stage 102 is connected to switched harmonic filter bank 103 where the harmonics of the amplified UHF transmit signal from the power output stage 102 are filtered. The amplified UHF transmit output is then passed to transmit/receive (T/R) matrix switch 104, and then through low-pass filter 135 to antenna 105. The T/R matrix switch 104 is used to switch the antenna 105 between the power output stage 102 and the UHF receive path 170 in FIG. 1 and the VHF receive path 185 in FIG. 3.

In UHF receive mode, a first (UHF) receive signal received by antenna 105 is passed though low-pass filter 135 through the T/R matrix switch 104 to a blanking function 145 that stops or blanks the receive signals. From the blanking function 145, the UHF receive signal goes to the UHF receive path 170 in FIG. 1 that comprises a first (UHF/VHF) receive switch 150 that switches between UHF receive and VHF receive and connects the signal to the first Tx/Rx switch 112 shared with the UHF transmit path 165. The switch 112 applies the UHF receive signal to the first agile filter 113, the low-noise amplifier 114, ALC attenuator 115, second agile filter 116, and then to the second Tx/Rx switch 117, all components shared with the UHF transmit path 165. In the UHF receive path 170, the second Tx/Rx switch 117 connects the UHF receive signal to a first (UHF) receive amplifier 118. The output of the first receive amplifier 118 is connected to the input switch 101 that provides an output to the translator 215 in FIG. 2 or other receiver (not shown).

In VHF transmit mode, a second (VHF) transmit signal from the translator 215 is passed through the input switch 101 to the VHF transmit path 175, shown in FIG. 3, comprising a third (VHF) agile filter 151 and then to a second (VHF/SATCOM) transmit (Tx) switch 152. The VHF/SATCOM Tx switch 152 switches between VHF transmit and SATCOM transmit. In the VHF transmit path 175, the VHF/SATCOM Tx switch 152 passes the VHF transmit signal to a third amplifier 153, a third ALC attenuator 154 and a fourth amplifier 155. The output of the fourth amplifier 155 is connected to the first (UHF/VHF) transmit switch 119 shared with the UHF transmit path 165 in FIG. 1, that switches between VHF transmit and UHF transmit. The VHF transmit signal from the VHF transmit path 175 in FIG. 3 is passed to the power output stage 102 where it is amplified and then passed through the switched harmonic filter bank 103, through the T/R matrix switch 104, through the low-pass filter 135 and then to the antenna 105.

In VHF receive mode, a second (VHF) receive signal received by antenna 105 is passed though low-pass filter 135 through the T/R matrix switch 104 to the blanking function 145. From the blanking function 145, the VHF receive signal goes to the VHF receive path 185 in FIG. 3 comprising the UHF/VHF receive switch 150, shared with the UHF receive path 170 in FIG. 1, that connects the VHF receive signal to the input switch 101 that provides an output to the translator 215 or other receiver (not shown).

In SATCOM transmit (Tx) a third (SATCOM) transmit signal from a SATCOM exciter (not shown) is connected to the SATCOM transmit path 180 in FIG. 3 comprising the VHF/SATCOM transmit switch 152 shared with the VHF transmit path 175. The switch 152 switches between VHF transmit and SATCOM transmit. In the SATCOM transmit path 180, agile filter 151 is not used and the third and fourth (VHF) amplifiers 152 and 155, shared with the VHF transmit path 175, have sufficient bandwidth for the UHF SATCOM transmit signal. Switch 152 passes the SATCOM transmit signal to the third amplifier 153, the third ALC attenuator 154 and the fourth amplifier 155. The SATCOM transmit signal from the fourth amplifier 155 is connected to the UHF/VHF transmit switch 119 also shared with the VHF transmit path 175 and the UHF transmit path 165, shown in FIG. 1, that switches between VHF transmit, SATCOM transmit, and UHF transmit. The SATCOM transmit signal output from the SATCOM transmit path 180 is passed to the power output stage 102 where it is amplified and then passed to the switched harmonic filter bank 103, through the T/R matrix switch 104 and then to a SATCOM antenna output.

As shown in FIG. 1, the two UHF frequency agile filters 113 and 116 are used in both the UHF transmit path 165 and the UHF receive path 170 by using universal power amplifier 210 internal RF switching. Frequency agile filters 113 and 116 maintain excellent signal-to-noise ratios throughout the transmit path. In UHF receive the signal is first routed to the agile filters 113 and 116 to reduce undesired signal levels at the input of the low-noise amplifier 114. The low-noise amplifier 114 operates with a very low noise figure allowing the system to have excellent receive sensitivity. The second two-pole agile filter 116 further reduces undesired signals prior to passing the UHF receive signal to the UHF receive amplifier 118 and then through the input switch 101 to the translator 215.

The UHF frequency agile filters 113 and 116 may be a two-pole min-loss PIN switched capacitor design and other designs may be used. Insertion loss of the UHF filters is 4 dB for the first filter 113 and 2 dB for the second filter 116. With an unloaded circuit Q of over 150, this provides 23 dB of attenuation for filter 113 and 14 dB of attenuation for filter 116 at +/−5% of the operating frequency. This filter performance provides improvement of the spectral containment of the drive from the translators 215.

The VHF transmit path 175 in FIG. 3 uses a single two-pole tracking filter 151. VHF emission requirements are not as stringent as UHF in the example system, so a second two-pole section is unnecessary. The fourth amplifier 155 is a 20-dB VHF driver stage that drives the power output stage 102. The power output stage 102 operates over the full frequency range of 30 to 400 MHz providing maximum functionality for the universal power amplifier 210.

By using internal switching, the universal power amplifier 210 high-power output stage 102 can be shared among VHF, UHF and SATCOM users, with no decrease in VHF/UHF receive functionality. For commonality, the same universal power amplifier 210 is used for all paths containing a PA, even where such switching is not needed. Additional RF switching allows the high-power output stage 102 to be used separately from filtering. In this manner, a VHF receive channel can be supported even during SATCOM use of the universal power amplifier 210 for transmission.

In SATCOM transmit, a SATCOM exciter (not shown) provides input drive to the SATCOM transmit path 180, in FIG. 3, that includes the fourth amplifier broad-band driver stage 155 that amplifies the SATCOM transmit signal to drive the high-power output stage 102. The signal from power output stage 102 is filtered for harmonics and switched to a port for connection to a SATCOM antenna (not shown).

The filtered VHF or UHF transmit signal is switched by the UHF/VHF transmit switch 119 to the power output stage 102 that provides 100 watts to the antenna 105. The power output stage 102 uses quadrature couplers 122 that provide excellent performance to back intermodulation products. These quadrature couplers 122 operate over the entire 30- to 400-MHz frequency range, matching the versatility of the amplifier stages 121 themselves and providing for VHF operation without additional circuitry. After harmonic and band-limiting filtering, the transmit RF signal is presented to the antenna 105.

The power output stage 102 may utilize rugged LDMOS (laterally diffused metal oxide semiconductor) transistor technology to form a very efficient, broadband amplifier capable of easily supplying the output power requirements. The entire design uses the very latest surface-mount components and high-density construction, providing low weight and volume. Consisting of two pairs of quadrature combined transistors, the module can generate 200 watts of peak power into a 50-ohm load, easily providing the necessary reserve power to fulfill the requirements for rated power including VSWR. The power output stage 102 operates continuously across the entire bandwidth supplying 12 to 15 dB of gain and presenting better than a 1.5:1 input match to a drive source. Biased in a Class AB mode, the design provides better than −30 dBc two-tone IMD performance and operates with approximately 50% dc-to-RF efficiency.

Harmonic filtering of the RF from the power output stage 102 is accomplished through the banded low-pass filter circuit 103. An internal directional coupler (not shown) behind the filter 103 monitors both forward and reflected power and sends DC analog signals back to a PA control 160 for monitoring and protection.

The T/R matrix switch 104 provides 40 dB of isolation, sufficient to exceed the amount of RF from antenna coupling. Internally, in the T/R switch matrix 104, the isolation must exceed not only the value of antenna isolation, but also the filtering of the first set of tracking filters. Therefore, this switch 104 provides 75 dB of isolation using separate switching sections.

It is believed that the universal power amplifier of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A universal power amplifier for amplifying and filtering transmit and receive signals, comprising:
   an input switch for switching the transmit and receive signals wherein the transmit and receive signals are at radio frequencies;
   a first transmit path connected to the input switch, said first transmit path for filtering and amplifying a first transmit signal, wherein said first transmit path comprises a first agile filter for filtering the first transmit signal;
   a first receive path connected to the input switch, said first receive path for filtering and amplifying a first receive signal, wherein said first receive path comprises the first agile filter for filtering the first receive signal;
   a power output stage connected to the first transmit path, said power output stage for amplifying the first transmit signal into a high-power first transmit signal;
   a transmit/receive matrix switch connected to the power output stage and the first receive path, said transmit/receive matrix switch for switching an antenna between the power output stage and the first receive path;
   a first transmit/receive switch for switching the first agile filter between the first transmit signal and the first receive signal;
   a low-noise amplifier connected to the first agile filter and to amplify the first transmit signal;
   a second agile filter connected to the low-noise amplifier and to filter the first transmit signal; and
   a second transmit/receive switch connected to the second agile filter and to switch the first transmit signal to the power output stage.

2. The universal power amplifier of claim 1 wherein the first receive path further comprises:
   a first receive switch for switching the first receive signal to the first transmit/receive switch;
   the first transmit/receive switch for switching the first receive signal to the first agile filter;
   the low-noise amplifier connected to the first agile filter and to amplify the first receive signal;
   the second agile filter connected to the low-noise amplifier and to filter the first receive signal;
   the second transmit/receive switch connected to the second agile filter and to switch the first receive signal; and
   a first receive amplifier connected to the second transmit/receive switch and to amplify the first receive signal and further connected to the input switch that provides the first receive signal at an output.

3. The universal power amplifier of claim 2, further comprising a second receive path, said second receive path comprising the first receive switch connected to the input switch and the first transmit/receive switch, said first receive switch for switching a second receive signal and the first receive signal.

4. The universal power amplifier of claim 1, wherein the first transmit path further comprises:
   a first amplifier connected to the input switch and to amplify the first transmit signal;
   a first automatic level control (ALC) attenuator connected to the first amplifier and the first transmit/receive switch and to vary a first transmit signal level;
   a second ALC attenuator connected to the low-noise amplifier and the second agile filter and to vary the first transmit signal level; and
   a first transmit switch connected to the second transmit/receive switch and to switch the first transmit signal to the power output stage.

5. The universal power amplifier of claim 1, further comprising a switched harmonic filter bank connected to the power output stage and the transmit/receive matrix switch and to filter the first transmit signal.

* * * * *